United States Patent
Donderici

(10) Patent No.: US 10,132,954 B2
(45) Date of Patent: Nov. 20, 2018

(54) DOWNHOLE TOOL WITH RADIAL ARRAY OF CONFORMABLE SENSORS FOR DOWNHOLE DETECTION AND IMAGING

(71) Applicant: Halliburton Energy Services, Inc., Houston, TX (US)

(72) Inventor: Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/466,047

(22) Filed: Mar. 22, 2017

(65) Prior Publication Data
US 2017/0254918 A1 Sep. 7, 2017

Related U.S. Application Data

(63) Continuation of application No. 14/765,714, filed as application No. PCT/US2014/058572 on Oct. 1, 2014, now abandoned.
(Continued)

(51) Int. Cl.
*G01V 3/28* (2006.01)
*E21B 47/00* (2012.01)
(Continued)

(52) U.S. Cl.
CPC ............ *G01V 3/28* (2013.01); *E21B 47/0002* (2013.01); *E21B 47/0006* (2013.01); *G01V 3/38* (2013.01); *G01V 11/005* (2013.01)

(58) Field of Classification Search
CPC ... G01V 3/18; G01V 3/26; G01V 3/28; G01V 3/22; G01V 3/24; G01V 3/38; G01V 11/005; E21B 47/0002; E21B 47/0006
(Continued)

(56) References Cited

U.S. PATENT DOCUMENTS

| 4,862,090 A | * | 8/1989 | Vannier ............... E21B 17/1021 324/367 |
| 5,132,623 A | | 7/1992 | De et al. |

(Continued)

FOREIGN PATENT DOCUMENTS

| EP | 1467060 A1 | 10/2004 |
| GB | 2425607 A | 11/2006 |
| WO | 2006031789 A2 | 3/2006 |

OTHER PUBLICATIONS

International Preliminary Report on Patentability issued in related Application No. PCT/US2014/058572, dated Apr. 14, 2016 (7 pages).
(Continued)

*Primary Examiner* — David M. Schindler
(74) *Attorney, Agent, or Firm* — Benjamin Fite; Baker Botts L.L.P.

(57) ABSTRACT

According to aspects of the present disclosure, an example downhole tool may include tool body, a first pad radially extendable from the tool body, and a radial array of conformable sensors coupled to the first pad. At least one conformable sensor of the radial array of conformable sensors may include a first flexible material. A transmitter may be coupled to one of the tool body and the first flexible material, and a receiver may be coupled to one of the tool body and the first flexible material. At least one of the transmitter and the receiver may be coupled to the first flexible material.

16 Claims, 6 Drawing Sheets

Related U.S. Application Data

(60) Provisional application No. 61/886,255, filed on Oct. 3, 2013.

(51) Int. Cl.
  *G01V 3/38* (2006.01)
  *G01V 11/00* (2006.01)

(58) Field of Classification Search
  USPC .................................................. 324/367, 374
  See application file for complete search history.

(56) References Cited

U.S. PATENT DOCUMENTS

| | | |
|---|---|---|
| 6,690,170 B2 | 2/2004 | Homan et al. |
| 7,567,649 B1 | 7/2009 | Safai et al. |
| 2005/0068036 A1 | 3/2005 | Wang et al. |
| 2005/0021252 A1 | 9/2005 | Homan et al. |
| 2006/0103389 A1 | 5/2006 | Bespalov et al. |
| 2009/0101337 A1 | 4/2009 | Neidhardt |
| 2009/0266609 A1 | 10/2009 | Hall et al. |
| 2009/0295392 A1* | 12/2009 | Feng .................. G01V 3/28 324/333 |
| 2012/0085166 A1 | 4/2012 | Furlong |
| 2012/0095686 A1 | 4/2012 | Legendre et al. |
| 2012/0136579 A1 | 5/2012 | Kvernvold |
| 2013/0057249 A1 | 3/2013 | Winter et al. |
| 2014/0244175 A1* | 8/2014 | Donderici .............. G01V 1/42 702/7 |
| 2015/0218941 A1* | 8/2015 | Clarke .................. E21B 49/08 324/324 |
| 2015/0346376 A1* | 12/2015 | Fouda .............. E21B 47/02224 324/338 |

OTHER PUBLICATIONS

Search Report issued in related EP Application No. 14850516.7, dated Jan. 25, 2016 (7 pages).

International Search Report and Written Opinion in related Application No. PCT/US2014/058572, dated Feb. 27, 2015 (10 pages).

Goldfine, Neil, Darrel Schlicker, and Andrew Washabaugh. "Surface-mounted eddy-current sensors for on-line monitoring of fatigue tests and for aircraft health monitoring." In Second Joint NASA/FAA/DoD Conference on Aging Aircraft, pp. 1-16. 1998.

Goldfine, Neil, Darrell Schlicker, Yanko Sheiretov, Andrew Washabaugh, Vladimir Zilberstein, and Timothy Lovett. "Conformable eddy-current sensors and arrays for fleetwide gas turbine component quality assessment." In ASME Turbo Expo 2001: Power for Land, Sea, and Air, American Society of Mechanical Engineers, 2001, pp. 904-909.

Goldfine, Neil, Vladimir Zilberstein, J. Steve Cargill, Darrell Schlicker, Ian Shay, Andrew Washabaugh, Vladimir Tsukernik, David Grundy, and Mark Windoloski. "Meandering winding magnetometer array eddy current sensors for detection of cracks in regions with fretting damage." Materials evaluation 60, No. 7 (2002): 870-877.

* cited by examiner

DOWNHOLE TOOL WITH RADIAL ARRAY OF CONFORMABLE SENSORS FOR DOWNHOLE DETECTION AND IMAGING

CROSS-REFERENCE TO RELATED APPLICATION

The present application is a continuation application of U.S. application Ser. No. 14/765,714 filed on Aug. 4, 2015 which is a U.S. National Stage Application of International Application No. PCT/US2014/058572, filed Oct. 1, 2014, which claims priority to U.S. provisional No. 61/886,255, filed Oct. 3, 2013 and titled "DOWNHOLE TOOL WITH RADIAL ARRAY OF CONFORMABLE SENSORS FOR CASING DETECTION AND IMAGING," which are incorporated herein by reference in their entirety for all purposes.

BACKGROUND

The present disclosure relates generally to downhole drilling operations and, more particularly, to a downhole tool with a radial array of conformable sensors for casing detection and imaging. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. In certain operations, measurements within the wellbore may be generated, including measurements of a casing within the wellbore. Typically, those measurements are limited with respect to their granularity, and small features within the wellbore may not be identifiable through the measurements.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

Figure 1:
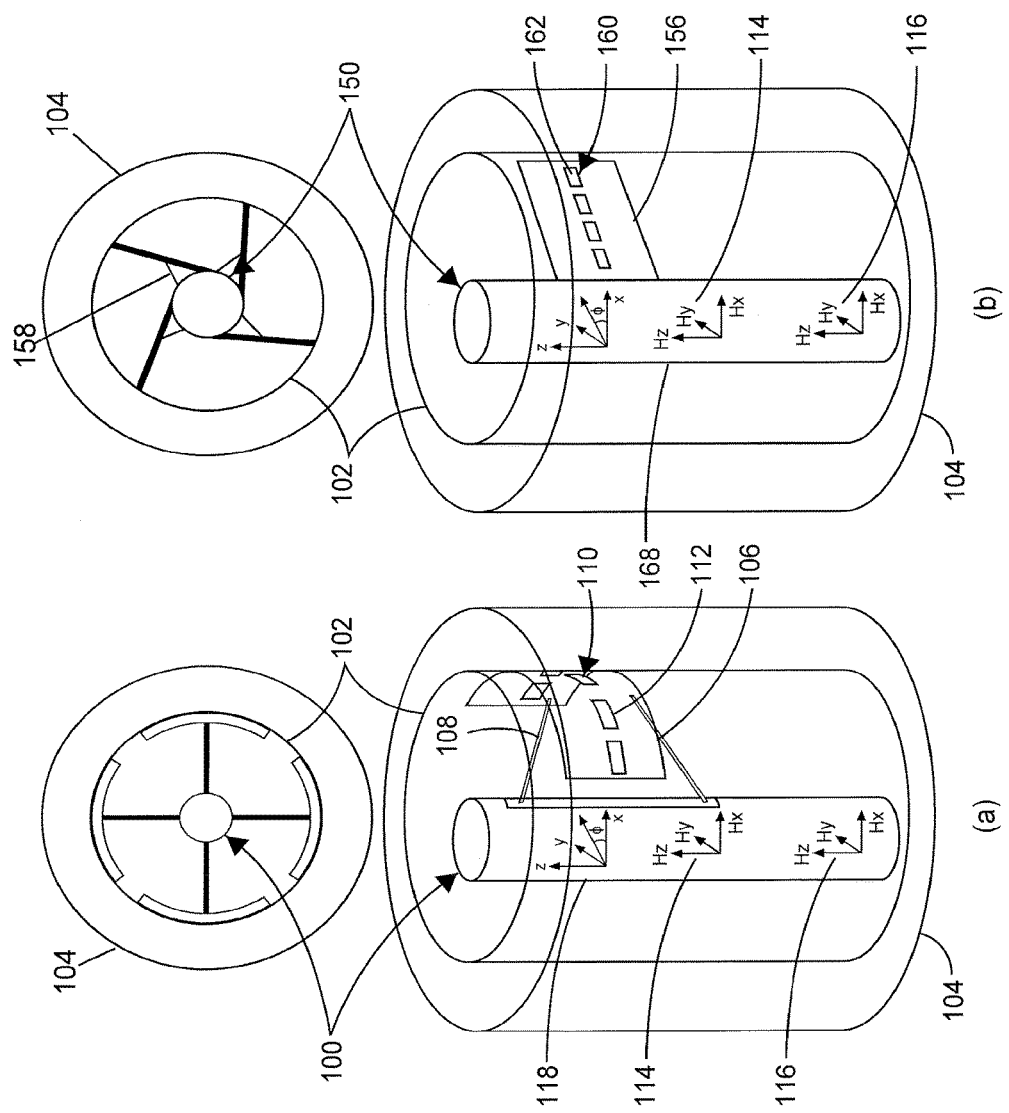
FIG. 1 is a diagram that shows two example downhole tools with conformable sensors on different type of pads, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to a radial array of conformable sensors for casing detection and imaging.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 6:
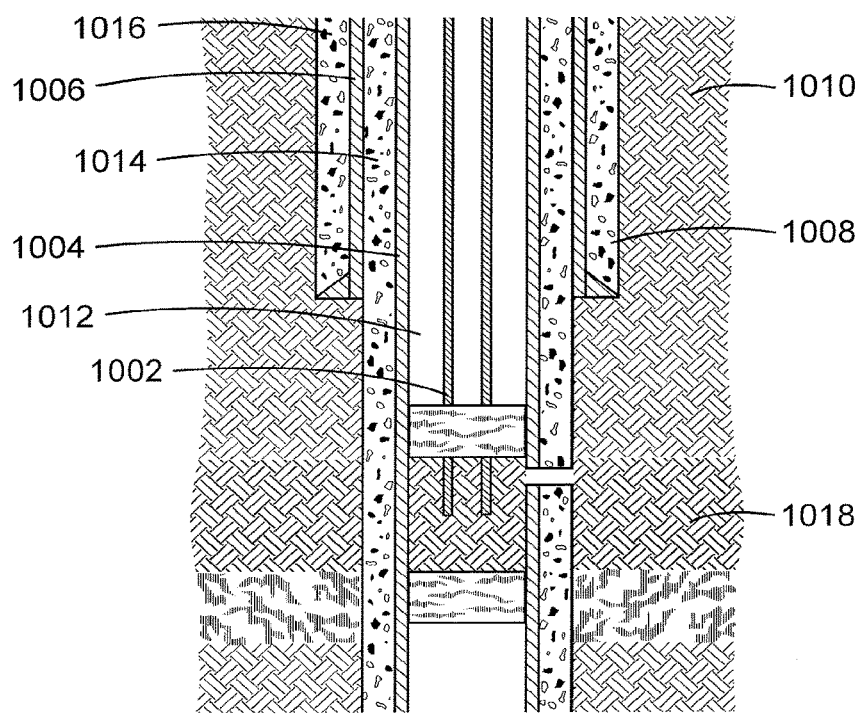
FIG. 6 is a diagram of an example production environment with multiple, concentric casings.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casings, may be secured within the borehole as part of the hydrocarbon recovery operation. FIG. 6 is a diagram of an example production environment and illustrates casings 1002, 1004, and 1006 disposed within a borehole 1008 in a rock formation 1010. The casings 1002-1006 may be concentric or nearly concentric and secured within the borehole 1008 and each other through cement layers 1012, 1014, and 1016. The center casing 102 may comprise a production casing where hydrocarbon from the formation strata 1018 is received at the surface (not shown).

The casings 1002-1006 may serve numerous purposes within a production and drilling environment, including preventing the borehole 1008 from collapsing after it is drilled and while it is being drilling, protecting a water table in the formation 1010 from contamination, and maintaining pressure within the borehole 1008. Accordingly, damage to the integrity of the casings 1002-1006 is problematic. Common damage to the casings includes crack and corrosion, which can be an indication of a defective cement bond between a casing and the borehole wall.

According to aspects of the present disclosure, a tool with a radial array of sensors may be positioned downhole proximate to survey, detect, and/or inspect the casings or other downhole elements, such as a borehole. In certain embodiments, the sensors may comprise flexible, conformable sensors. As used herein, conformable sensors may comprise planar sensors that are printed or disposed on a flexible material that can conform to the shape of a surface with which it is in contact, and that provide for a high resolution, azimuthally sensitive measurement of a target. As will be described below, utilizing a radial array of conformable sensors provides for high-resolution measurements corresponding to a first casing closest to the downhole tool as well as a large depth on investigation to generate measurements corresponding to other, concentric casings outside of the first casing. Although the measurements will be primarily described below with respect to casings, similar measurements may be taken of a borehole or formation without a casing.

FIG. 1 is a diagram that shows two example downhole tools 100 and 150 with conformable sensors, according to aspects of the present disclosure. Both are shown disposed in concentric pipes 102 and 104, such as in a cased environment. In certain embodiments, the downhole tools 100 and 150 may comprise wireline survey or measurement tools that can be introduced into an open hole (non-cased) environment, a cased environment, or within the bore of a drill string in a conventional drilling assembly. In certain embodiments, the downhole tools 100 and 150 may be included in a LWD/MWD segment of a bottom hole assembly (BHA) in a conventional drilling assembly. The tools 100 and 150 may be physically and/or communicably coupled to a control unit (not shown) at the surface through a wireline or slickline, or any other conveyance, or through a downhole telemetry systems, such as a mud pulse telemetry system. The tool 100 may also comprise a control unit that is communicably coupled to the conformable sensors of the tools. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

The tools 100 and 150 may comprise respective tool bodies 118 and 168, and at least one conformable sensor coupled to the respective tool bodies. For example, conformable sensor 112 is coupled to the tool body 118, and conformable sensor 162 is coupled to tool body 168. The conformable sensor 112 that is one of an azimuthal array 110 of conformable sensors disposed on a pad 106 that is coupled to and extendable from a tool body 118 of the tool 100 through spring mechanisms or motorized arms 108. When extended, the pad 106 and the conformable sensor 112 may contact the pipe 102, but may also be used to contact a borehole wall in other applications. The elasticity of the pad 106 and tension in the arm 108 may be designed in such a way that the pad 106 will substantially deform to the shape of the pipe 102, increasing the resolution of the resulting measurements. Other pads similar to pad 106 may be arranged on different sides of the tool 100 to mechanically balance the tool 100 within the pipe 102. In other embodiments, expandable arms may be used opposite the pad 106 to mechanically balance the tool 100. In certain embodiments, the array 110 of conformable sensors may be arranged on the pad 106 to perform sensing at different azimuthal positions with respect to the tool body 118. In embodiments where multiple pads are used, each pad may include an array of conformable sensors to perform sensing at different azimuthal positions, and the pads may be arranged with respect to the tool body 118 such that there is full 360 degree coverage around the tool 100, where one pad covers one set of angles, and other stations cover other sets, providing full coverage.

In contrast to the downhole tool 100, the conformable sensor 162 is one of a radial array 160 of conformable sensors disposed on an pad 156 that is coupled to and extendable from a tool body 168 of the tool 150 through spring mechanisms or motorized arms 158. When extended, an outer edge of the pad 156 may come near to or contact the pipe 102. Other pads similar to pad 156 may be arranged on different sides of the tool 150. In certain embodiments, the radial array 160 of conformable sensors may collect measurements at different radial orientations with respect to the tool body 168. In embodiments where multiple pads are used, the pads may be azimuthally spaced around the tool body 168 such that measurements at the different radial orientations are made to cover a full 360 degrees the tool body 168, where one pad covers one set of angles, and other pads cover other sets, providing full coverage.

The conformable sensors 112 and 162 may include portions that function as transmitters that generate electromagnetic (EM) fields in a target, such as pipe 102, and portions that function as receivers that receive and measure the current responses of the target to the generated EM fields. In certain embodiments, in addition to the conformable sensors 112 and 112, the downhole tools 100 and 150 may comprise separate transmitters 114 or receivers 116 mounted on the tool body 118. These additional transmitters 114 or receivers 116 may be inductive-type antennas, realized with coils, solenoids or rotating or moving magnets. In certain embodiments, EM fields may be generated and the corresponding current responses measured with any combination of the transmitter 114, the receiver 112, and the transmitters and receivers within the conformable sensors 112 and 162. As will be described in detail below, the measured current responses may be processed to identify physical and electrical parameters of the target and the parameters may be visualized to identify features of the target. Notably, when the transmitter is farther away from the receiver, the depth of investigation increases but the measurement resolution decreases. Utilizing combinations of the transmitters and receivers in the conformable sensors of the radial array 160, therefore, provide flexibility to increase the depth of investigation used to measure the pipes 102 and 104 while still maintaining an acceptable level of resolution.

In use, the downhole tool 100 may generate high-resolution measurements of the pipe 102 by placing the pad 106 in contact with the pipe 102 and transmitting a time-varying EM signal from a transmitter of the conformable sensor 112. The signal may generate eddy currents in the pipe 102. The eddy currents may generate secondary currents that contain information about the parameters of the pipe 102, and the secondary currents may be measured at one or more receivers of the conformable sensor 112. In contrast, the downhole tool 150 may generate lower-resolution, higher depth of investigation measurements of the pipes 102 and 104 by transmitting a time-varying EM signal from transmitter 114 and measuring the current response of the pipe 104 at one or more receivers of the radial array 160.

Figure 2:
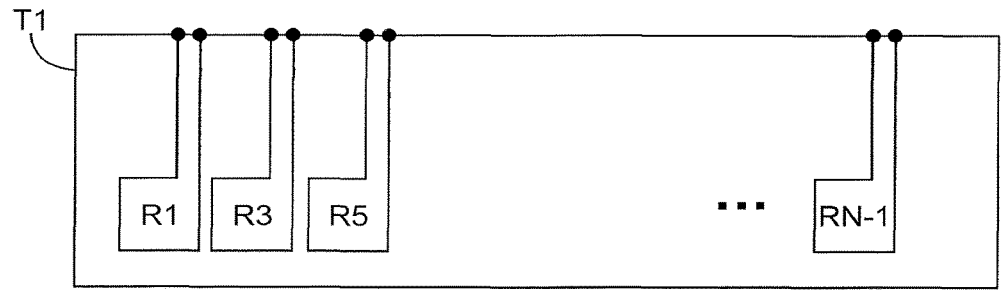
FIG. 2 is a diagram of example antenna windings for a conformable sensor, according to aspects of the present disclosure.

FIG. 2 is a diagram of example antenna configuration for a conformable sensor, according to aspects of the present disclosure. The configuration shown may comprise a single conformable sensor and may be formed by circuit printing or other deposition methods on a flexible surface (not shown). As can be seen, the windings include an outer transmitter T1 and an array of receivers R1-RN. In certain embodiments, each of the receivers R1-RN may comprise one or more antenna windings to measure signals in at least two different directions. Although one example configuration for a conformable sensor is shown in FIG. 2, other configurations are possible. For example, the size, number, and relative orientations of the transmitter T1 and receivers R1-RN may be altered, and the functionality of the receivers and transmitters can be switched.

Ports of the transmitter T1 and receivers R1-RN may be electrically connected to transmitter and receiver boards (not shown) that cause the transmitter T1 to generate EM signals and cause the receivers R1-RN to measure the responses to the generated EM signals. In certain embodiments, the transmitter T1 may generate a signal, and each of the receivers R1-RN may separately measure a response to the signal. Accordingly, the number and size of the receivers may determine the granularity and resolution of an image resulting from the receiver measurements. In certain embodiments, the combinations of transmitters and receivers used to generate EM signals and measure current responses may be varied dynamically by a control unit coupled to the transmitter and receiver boards.

Figure 3:
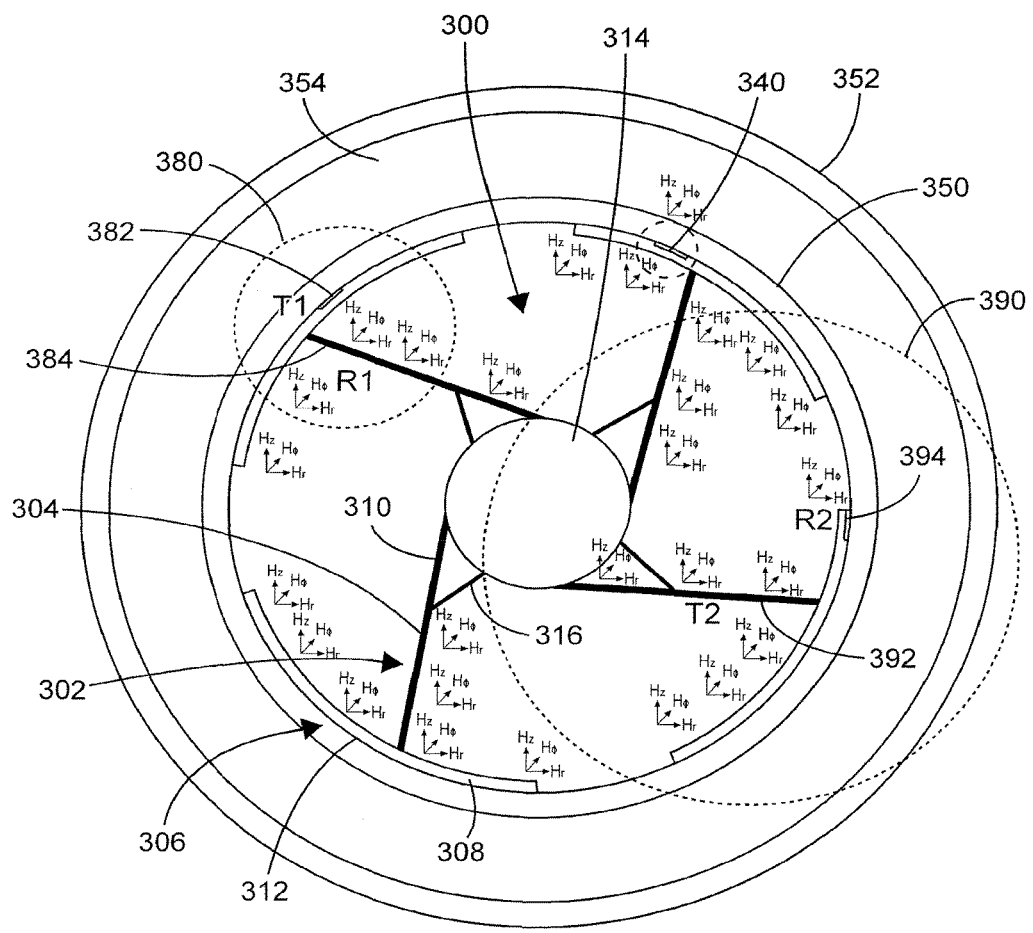
FIG. 3 is a diagram of an example downhole tool within a multiple casing environment, according to aspects of the present disclosure.

FIG. 3 is a diagram of an example downhole tool 300, according to aspects of the present disclosure. The downhole tool 300 is shown positioned within casings or pipes 350 and 352 in a downhole environment. The pipes 350 and 352 may be separated by a cement layer 354. In certain embodiments, additional pipes (not shown) may be located outside of pipe 352. The downhole tool 300 comprises a conformable sensor 304 that is one sensor of a radial array of sensors 302, and a conformable sensor 308 that is one sensor of an azimuthal array of sensors 306. The radial array 302 and azimuthal array 306 may be positioned on flexible pads 310 and 312, respectively. The pad 310 may be coupled to and extendable from a tool body 314 of the downhole tool 300 through an extendable arm 316. When extended, the pad 310 may form a generally planar surface forming a tangent from a surface of the tool body 314.

In certain embodiment, the pad 312 may be coupled to the pad 310, such as through a hinge mechanism (not shown). When the pad 310 is extended by the arm 316, the pad 312 may contact the pipe 350, substantially conforming to the shape of the pipe 350. Notably, when the pad 312 is in contact within the pipe 350, the conformable sensor 308 may also contact the pipe 350, and may provide a high-resolution, azimuthally sensitive measurements of the pipe 350 using a transmitter and receiver co-located on the conformable sensor 308.

FIG. 3 further illustrates measurement ranges accomplished using different combinations of transmitters and receivers from conformable sensors of the radial and azimuthal arrays. The depth of investigation increases and the measurement resolution decreases as the transmitter moves further away from the receiver. Within a single conformable sensor 340, for example, the distance between the transmitter and receiver is negligible or non-existent because the receiver may be located within the transmitter winding, leading to a high-resolution localized measurement of the pipe 350. In contrast, when transmitters and receivers from different conformable sensors are used, the depth of investigation may increase. Circle 380 illustrates the depth of investigation when measurements are taken using transmitter T1 from a conformable sensor 382 located in an azimuthal array and a receiver R1 of a conformable sensor 384 located in a radial array. Similarly circle 390 illustrates the depth of investigation when measurements are taken using transmitter T2 from a conformable sensor 392 located in radial array and a receiver R2 of a conformable sensor 394 located in an azimuthal array. As can be seen, the transmitter T2 is further from the receiver R2 than the transmitter T1 is to receiver R1, leading to a larger range of measurement 390 for the transmitter T2 and the receiver R2. Notably, the range 390 covers a portion of the pipe 352, resulting in a response from the pipe 352 being measured by the receiver R2. Any combination of conformable sensors may be used.

Figure 4:
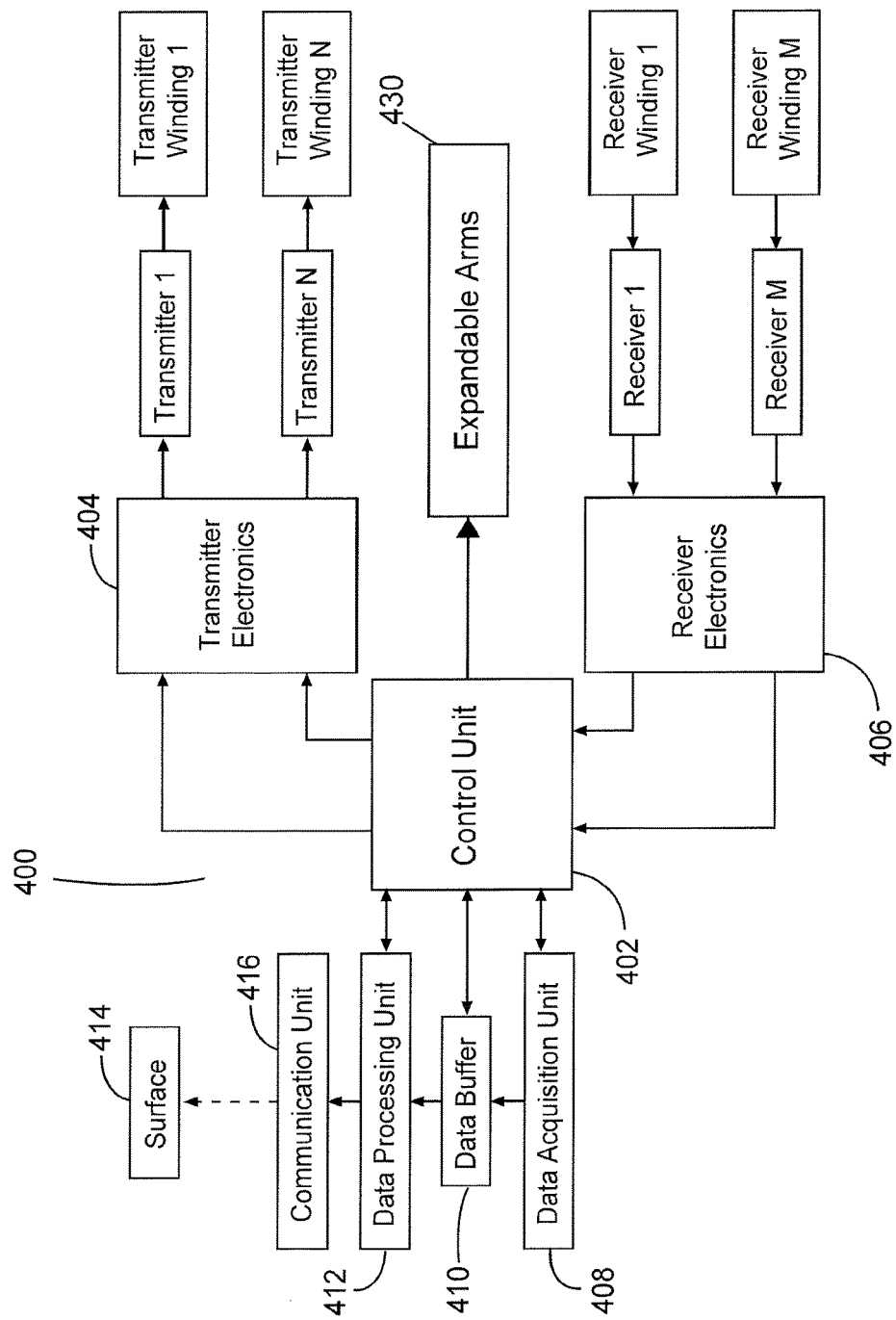
FIG. 4 is a diagram of an example control system for a downhole tool with a radial array of sensors, according to aspects of the present disclosure.

In certain embodiments, a downhole tool with a radial array of conformable sensors may comprise a control system to control when and how the EM signals are transmitted and the responses are measured. FIG. 4 is a diagram of an example control system 400 for a downhole tool with a conformable sensor, according to aspects of the present disclosure. The system 400 comprises a control unit 402 that may function as the primary controller for the tool and may be communicably coupled to transmitters 1-N through transmitter electronics 404, to receivers 1-M through receiver electronics 406, and to mechanical, electrical or hydraulic elements 430 coupled to and configured to extend pads to which the transmitters 1-N and receivers 1-M coupled. The transmitters 1-N and receivers 1-M may comprise elements of conformable sensors located in a radial array of a conformable sensors, or conformable sensors located in radial and azimuthal arrays of conformable sensors. The transmitter electronics 404 and receiver electronics 406 may comprise circuit boards to which some or all of the transmitters 1-N and receivers 1-M are coupled.

The control unit 402 may trigger the transmitter electronics 404 to generate a time-varying EM signal through one or more of the transmitters 1-N. The time-varying EM signal may be a sinusoidal signal, its phase and amplitude set at a desired value. As is described above, the EM signals generated through the transmitters 1-N may generate eddy currents in a pipe that is in immediate contact with the conformable sensors, as well as pipes that are located away from the conformable sensors, provided a transmitter and receiver combination with a sufficient depth of investigation is used. The eddy currents may generate secondary currents that contain information about pipes. The secondary currents generated may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

The control unit 402 may receive the measurements from the receivers 1-N through the receiver electronics 406 and may transmit the measurements to the data acquisition unit 408. For a specific transmitter excitation, measurements from multiple receivers can be generated and received at the same time. Similarly, multiple transmitters 1-N can be excited at the same time and they can be time, frequency or jointly multiplexed for latter demultiplexing operation at the receivers. Upon reception at the data acquisition unit 408, the measurements may be digitized, stored in a data buffer 410, preprocessed at data processing unit 412, and sent to the surface 414 through a communication unit 416, which may comprise a downhole telemetry system.

In certain embodiments, the control unit 402 may select the combinations of the transmitters and receivers to use to make measurements based, at least in part, on the corresponding depth of investigation for the transmitters and receivers. The control unit 402 may comprise a set of instructions and may generate control signals to the transmitter and receiver electronics based, at least in part, on the instructions. For example, the control center 402 may issue control signals to the transmitter and receivers to take different types of measurements within certain time periods. Example types of measurements include measurements with low-depth of investigations, medium depth of investigation, and high depth of investigation.

In certain embodiments, the resulting measurements may be aggregated and processed to determine for one or more casings or pipes in a downhole environment. In certain embodiments, processing the measurements may comprise processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface. The measurements may be processed with an inversion algorithm stored as a set of instructions in a memory device of the control unit and executable by a processor of the control unit to perform data calculations and manipulations necessary for the inversion algorithm. The inversion algorithm may be specific to the environment in which the downhole tool is used and may be designed to calculate downhole parameters unique to the environment.

Figure 5:
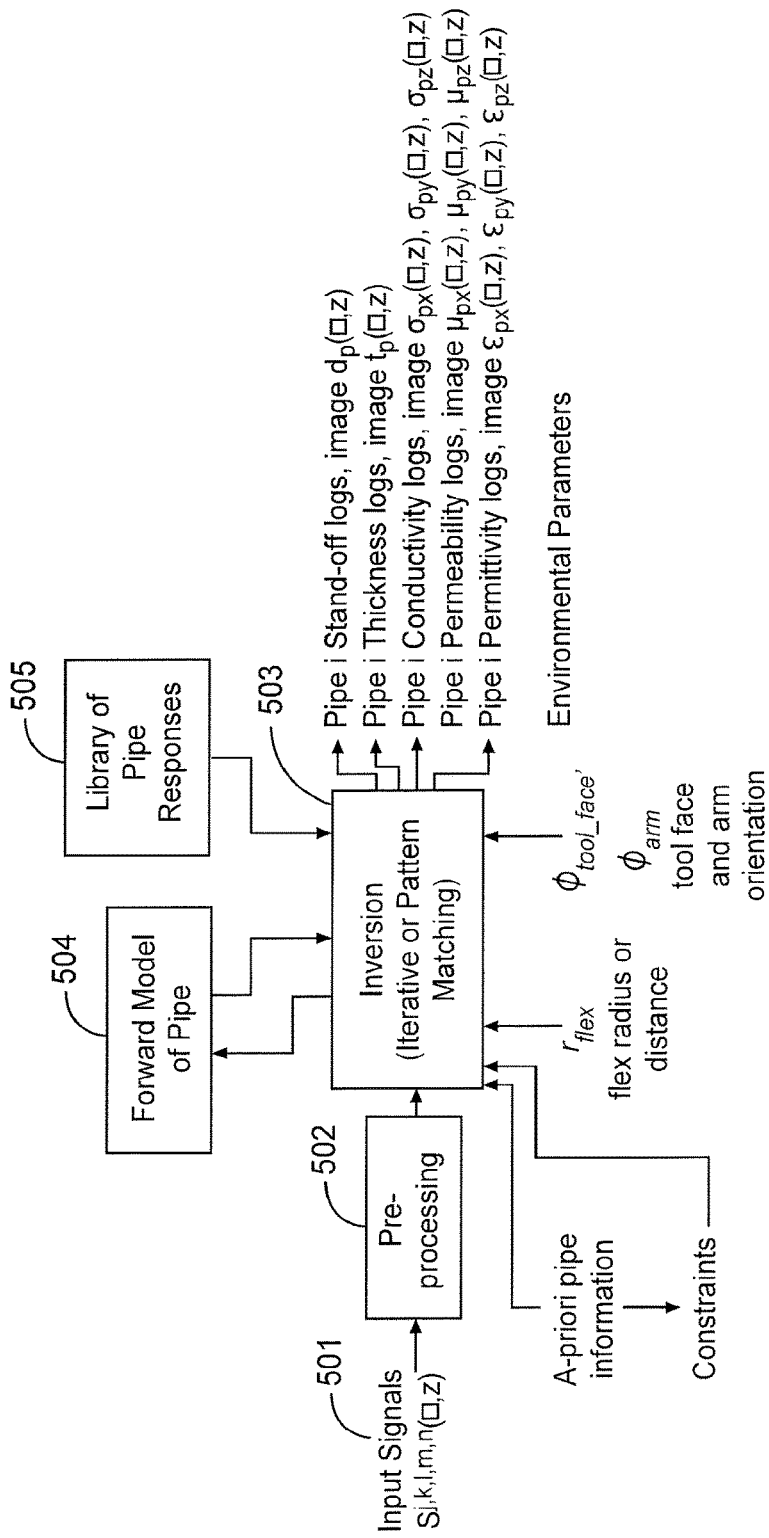
FIG. 5 is a block diagram of an example inversion algorithm for measurements from a cased environment, according to aspects of the present disclosure.

FIG. 5 is a block diagram on an example inversion algorithm for a downhole environment with one or more casings or pipes, according to aspects of the present disclosure. Although the inversion algorithm in FIG. 5 is directed to determining parameters of a downhole pipe, a similar inversion algorithm may be used to determine parameters of a borehole. An input signal 501 may comprise measurements from the receivers of conformable sensors arranged in a radial array on the downhole tool. In certain embodiments, the input signals may be divided into time components and may be identified by the receiver which made the measurement and the transmitter that generated the eddy current/secondary current measured by the receiver. The measurements may also be identified by the pipe to which they correspond, when measurements on multiple pipes in a downhole environment are taken.

The inversion algorithm may comprise a pre-processing block 502, which may receive the input signals 501. The pre-processing block 502 may process the input signals to compensate for downhole conditions or to convert the input signals to a form usable within an inversion block 503. For example, the pre-processing block 502 may process the measurements to calibrate for temperature effects, convert between frequency to time domain, convert between complex-value to phase and amplitudes, and/or to remove noise by filtering in azimuth or depth.

The inversion algorithm further may comprise an inversion block 503, which may receive and process the signals from the pre-processing block 502 to determine parameters for one or more of the pipes or casings in the downhole environment. In certain embodiments, the inversion block 503 may receive a model 504 of a downhole environment with one or more pipes. The inversion block 503 may implement a cost function to determine pipe parameters that produce the minimum mismatch between the model 504 and the input signals 501, examples of which are described below. The cost function may be defined, for example, by utilizing least squares minimization through $L_2$ norm.

In certain embodiments, a library 505 of pipe responses to different signals can be used instead of or in addition to the model 504. For example, the library 505 may be used if the parameter dimensions of the pipe responses are low in number and also small in range, so that an accurate library can be calculated. If library 505 is used, a multi-dimensional interpolation can be used to obtain the pipe parameters closest to the measurements reflected in the input signal 501.

In certain embodiments, the inversion block 503 may further account for the flex and radius of any azimuthal arrays of conformable sensors used in the downhole tool, as well as pad flex characteristics, tool face, and arm orientation of any radial arrays of conformable sensors used in the downhole tool. The inversion block 503 may use the tool information when processing using the model 504 or library 505 to determine the exact positions of the sensors by utilizing geometrical calculations that involve pad flexing characteristics and also tool face angle and arm orientation.

The inversion block 503 may output one of more pipe parameters determined using the cost function. The parameters may comprise physical parameters, such as the stand-off distances between the sensors and the pipes and the thicknesses of the pipes, as well as electrical parameters of the pipes, such as conductivity, permeability, and permittivity. Visualizations can be generated based, at least in part, on the determined pipe parameters and used to identify features of the pipes, such as cracks or corrosion. Notably, because of the resolution of the conformable sensors, the resulting visualizations may have high-resolution and azimuthal sensitivity, indicating very small changes in the pipe parameters that correspond to very small features (on the order of 0.1 inches) on the pipe in direct contact with the conformable sensor.

In a multi-pipe environment, where measurements are made on more than one pipe, the resulting measurements may be indexed to identify the corresponding pipe. Notably, the resolution of the measurements and resulting images for each pipe decreases the further the pipe is away from the conformable sensor, due to the increasing stand-off of between the pipe and the transmitters and receivers of the conformable sensors. However, the use of radial arrays of sensors may improve and increase the data points for the outer pipes, providing better estimates for the pipe parameters.

In certain embodiments, the downhole tool may make measurements as it is lowered to different depths within the pipe, collecting more data points. In certain embodiments, pipe parameters may be determined for each of the data points and combined to form a log of the pipe, providing an image of the entire pipe, rather than one axial portion. Alternatively, discrete azimuthal measurements from each depth can be combined to obtain an image of the pipe. In addition to the pipe parameters, certain environmental parameters, such as temperature, pipe stresses, eccentricity of the tool in the borehole or pipe can be obtained.

Figure 7:
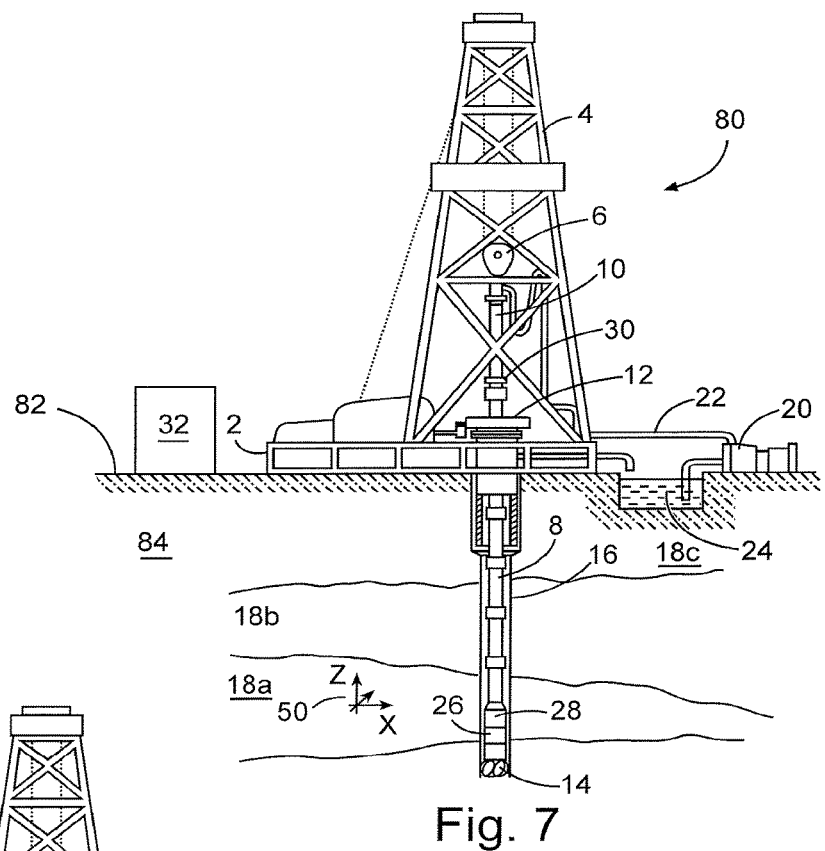
FIG. 7 is a diagram showing an illustrative logging while drilling environment, according to aspects of the present disclosure.

FIG. 7 is a diagram of a subterranean drilling system 80 incorporating a downhole tool 26 with conformable sensors arranged in a radial array, according to aspects of the present disclosure. The drilling system 80 comprises a drilling platform 2 positioned at the surface 82. In the embodiment shown, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the downhole tool 26 with a radial array of conformable sensors extending from the tool 26. As the bit extends the borehole 16 through the formations 18, the tool 26 may collect measurements relating to borehole 16 and formation the resistivity of the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may be communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84, and may also generate visualizations of the borehole 16 and formation 84 based, at least in part, on the determined parameters through which features of the downhole elements, such as cracks and fractures, may be identified.

Figure 8:
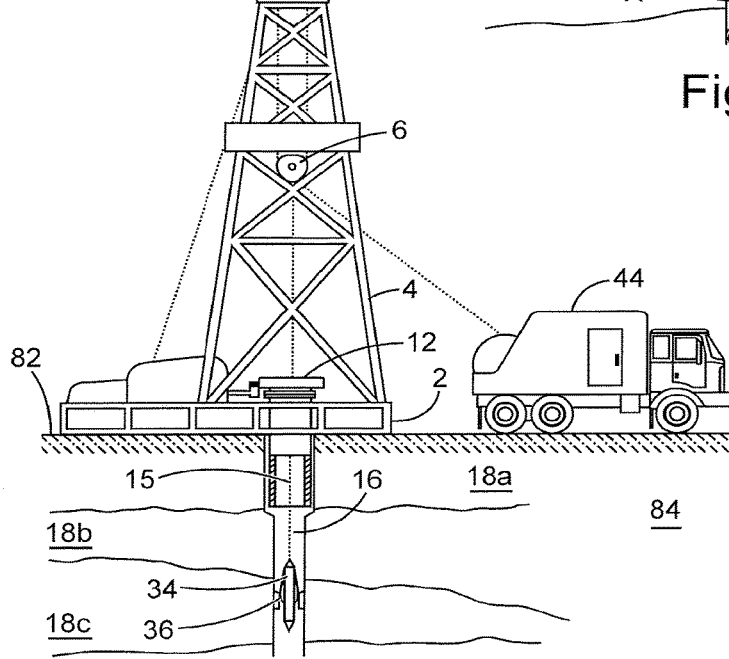
FIG. 8 is a diagram showing an illustrative wireline logging environment, according to aspects of the present disclosure.

At various times during the drilling process, the drill string 8 may be removed from the borehole 16 as shown in FIG. 8. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may comprise a downhole tool 36 having a radial array of conformable sensors, similar to the tool 26 described above. The tool 36 may be communicatively coupled to the cable 15. A logging facility 44 (shown in FIG. 8 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

According to aspects of the present disclosure, an example downhole tool may include tool body, a first pad radially extendable from the tool body, and a radial array of conformable sensors coupled to the first pad. At least one conformable sensor of the radial array of conformable sensors may include a first flexible material. A transmitter may be coupled to one of the tool body and the first flexible material, and a receiver may be coupled to one of the tool body and the first flexible material. At least one of the transmitter and the receiver may be coupled to the first flexible material. The transmitter and the receiver may be directly or indirectly coupled to the tool body by being coupled to the first pad or the first flexible material.

In certain embodiments, the receiver may comprise at least two windings with different orientations. In certain embodiments, the tool may further include a second pad extendable from the tool body and an azimuthal array of conformable sensors coupled to the second pad. The second pad may be coupled to the first pad. In any of the embodiments described in this paragraph, the azimuthal array of conformable sensors may comprise a second conformable sensor that includes a second flexible material, a second transmitter coupled to the second flexible material, and a second receiver coupled to the second flexible material.

In any of the embodiments of the preceding two paragraphs, the downhole tool further may comprise a control unit comprising a processor and a memory device coupled to the processor, the memory device containing a set of instructions that, when executed by the processor, cause the processor to select a first combination of conformable sensors to generate a current response measurement with a first depth of investigation; and select a second combination of conformable sensors to generate a current response measurement with a second depth of investigation. In certain embodiments, the first combination of sensors may comprise at least one of two conformable sensors of the azimuthal array of sensors, two conformable sensors of the radial array of sensors; and one conformable sensor of the azimuthal array of conformable sensors and one conformable sensor of the radial array of conformable sensors. In certain embodiments, the first depth of investigation may be larger than the second depth of investigation. In certain embodiments, the set of instructions further may cause the processor to determine a parameter of a downhole element remote from radial array of conformable sensors and the azimuthal array of conformable sensors based, at least in part, on at least one of the current response measurement with the first depth of investigation and the current response measurement with the second depth of investigation.

According to aspects of the present disclosure, an example method for downhole surveying or measuring may include positioning a downhole tool with a radial array of conformable sensors within a borehole in a subterranean formation; generating a first measurement with a first depth of investigation using a first combination of conformable sensors in the radial array of conformable sensors; and generating a second measurement with a second depth of investigation using a second combination of sensors in the radial array of conformable sensors. In certain embodiments, the radial array of conformable sensors is coupled to a first pad extendable from the downhole tool. In certain embodiments, positioning the downhole tool with the radial array of conformable sensors within the borehole comprises positioning the downhole tool with the radial array of conformable sensors and an azimuthal array of conformable sensors within the borehole. In certain embodiments, the azimuthal array of conformable sensors is coupled to a second pad coupled to the first pad. In certain embodiments, the method further includes generating a third measurement with a third depth of investigation using a third combination of conformable sensors in the radial and azimuthal arrays of conformable sensors.

In any embodiment described in the preceding paragraph, the first and second measurements may correspond to current responses of at least one downhole element within the borehole to an electromagnetic signal generated by the conformable sensors. In certain embodiments, the method may further comprise determining a parameter for a downhole element based, at least in part, on at least one of the first and second measurements. In certain embodiments, the method may further comprise generating a first visualization of the downhole element based, at least in part, on the determined parameter. In certain embodiments, the downhole element may comprise one of a casing, a cement layer outside of the casing, a wall of the borehole, and the subterranean formation. In certain embodiments, the casing may comprise a casing remote from the radial and azimuthal arrays of conformable sensors. In certain embodiments, the method may further comprise determining a parameter for another downhole element based, at least in part, on at least one of the first and second measurements wherein the downhole element comprises a casing and the other downhole element comprises an other casing concentric with and outside of the casing.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A downhole tool, comprising
a tool body;
a first pad radially extendable from the tool body, wherein the first pad is flexible, and wherein the first pad extends to form a planar surface that forms a tangent from a surface of the tool body;
a radial array of conformable sensors coupled to the first pad, wherein the conformable sensors of the radial array are aligned along the tangent from the surface of the tool body, and wherein at least one conformable sensor of the radial array of conformable sensors comprises a first flexible material;
a second pad directly coupled to the first pad, wherein the second pad is extended when the first pad is extended;
an azimuthal array of conformable sensors coupled to the second pad, wherein each conformable sensor of the azimuthal array of conformable sensors is arranged azimuthally with respect to the tool body, and wherein the azimuthal array of conformable sensors senses at one or more azimuthal positions with respect to the tool body;
wherein at least a first portion of the radial array of conformable sensors functions as at least one of a first transmitter and a first receiver; and
wherein the at least one of the first transmitter and the first receiver is coupled to the first flexible material.

2. The downhole tool of claim 1, wherein the at least a first portion of the radial array of conformable sensors functions as the first transmitter and at least a second portion of the radial array of conformable sensors functions as the first receiver, and wherein both the first transmitter and the first receiver are coupled to the first flexible material; and
the first receiver comprises at least two windings with different orientations.

3. The downhole tool of claim 1, wherein the azimuthal array of conformable sensors comprises a second conformable sensor that includes
a second flexible material, wherein a first portion of the azimuthal array of conformable sensors functions as a second transmitter and a second portion of the azimuthal array of conformable sensors functions as second receiver, and wherein the second transmitter and the second receiver are coupled to the second flexible material.

4. The downhole tool of claim 1, further comprising a control unit comprising a processor and a memory device coupled to the processor, the memory device containing a set of instructions that, when executed by the processor, cause the processor to:
select a first combination of the conformable sensors to collect a current response measurement with a first depth of investigation; and
select a second combination of the conformable sensors to collect a current response measurement with a second depth of investigation.

5. The downhole tool of claim 4, wherein the first combination of sensors comprises at least one of
two conformable sensors of the azimuthal array of sensors,
two conformable sensors of the radial array of sensors; and
one conformable sensor of the azimuthal array of conformable sensors and one conformable sensor of the radial array of conformable sensors.

6. The downhole tool of claim 4, wherein the first depth of investigation is larger than the second depth of investigation.

7. The downhole tool of claim 6, wherein the set of instructions further causes the processor to determine a parameter of a downhole element remote from the radial array of conformable sensors and the azimuthal array of conformable sensors based, at least in part, on at least one of the current response measurement with the first depth of investigation and the current response measurement with the second depth of investigation.

8. A method for downhole surveying or measuring, comprising
positioning a downhole tool with a radial array of conformable sensors and an azimuthal array of conformable sensors at least partially within a borehole in a subterranean formation, wherein at least one conformable sensor of the radial array of conformable sensors comprises a flexible material;
coupling the radial array of conformable sensors to a first pad extendable from the downhole tool, wherein the first pad is flexible, and wherein the first pad extends to form a planar surface that forms a tangent from a surface of a body of the downhole tool, wherein the conformable sensors of the radial array are aligned along the tangent from the surface of the body of the downhole tool;
coupling the azimuthal array of conformable sensors to a second pad extendable from the downhole tool, wherein the second pad is directly coupled to the first pad and wherein the second pad is extended when the first pad is extended;
generating a first measurement with a first depth of investigation using a first combination of conformable sensors in the radial array of conformable sensors; and
generating a second measurement with a second depth of investigation using a second combination of sensors in the radial array of conformable sensors.

9. The method of claim 8, further comprising generating a third measurement with a third depth of investigation using a third combination of conformable sensors in the radial and azimuthal arrays of conformable sensors.

10. The method of claim 8, wherein the first and second measurements correspond to current responses of at least one downhole element within the borehole to an electromagnetic signal generated by the conformable sensors.

11. The method of claim 10, further comprising determining a parameter for a first downhole element of the at least one downhole element based, at least in part, on at least one of the first and second measurements.

12. The method of claim 11, further comprising generating a first visualization of the first downhole element of the at least one downhole element based, at least in part, on the determined parameter.

13. The method of claim 12, wherein the first downhole element of the at least one downhole element is a casing, a cement layer outside of the casing, a wall of the borehole, or the subterranean formation.

14. The method of claim 12, wherein the first downhole element of the at least one downhole element is a casing, and wherein the casing comprises a casing remote from the radial and azimuthal arrays of conformable sensors.

15. The method of claim 11, further comprising determining a parameter for a second downhole element of the at least one downhole element based, at least in part, on at least one of the first and second measurements wherein the first downhole element of the at least one downhole element comprises a first casing and the second downhole element of the at least one downhole element comprises a second casing concentric with and outside of the first casing.

16. The method of claim 8, wherein generating the first measurement comprises using a first transmitter from a conformable sensor of the azimuthal array of conformable sensors and a first receiver of a conformable sensor of the radial array of conformable sensors.

\* \* \* \* \*